(No Model.)
T. M. CHAPMAN.
FEED ROLL FOR SAW MILLS.
No. 273,817. Patented Mar. 13, 1883.
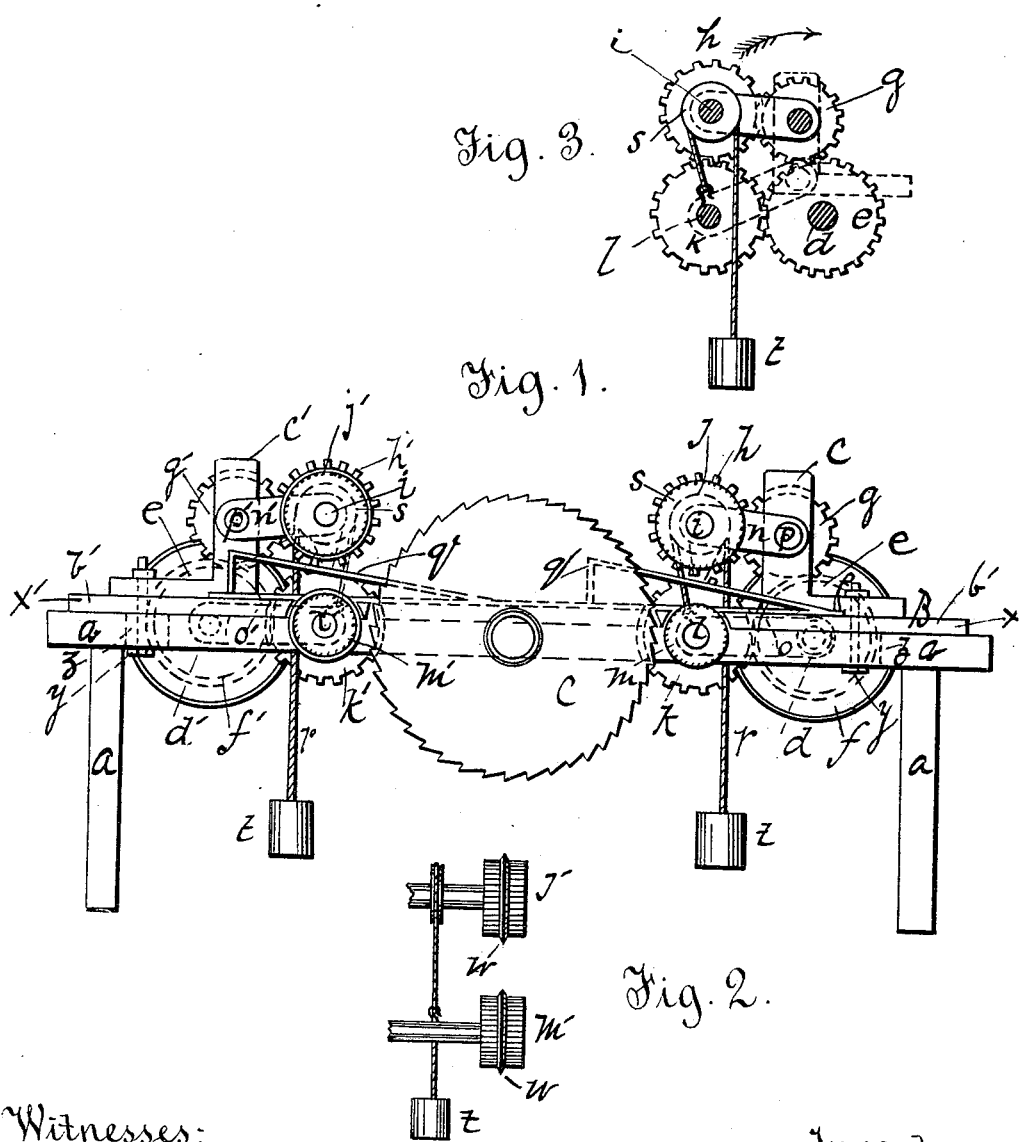

UNITED STATES PATENT OFFICE.

THOMAS M. CHAPMAN, OF OLDTOWN, MAINE.

FEED-ROLL FOR SAW-MILLS.

SPECIFICATION forming part of Letters Patent No. 273,817, dated March 13, 1883.

Application filed June 15, 1882. (No model.)

*To all whom it may concern:*

Be it known that I, THOMAS M. CHAPMAN, of Oldtown, Penobscot county, and State of Maine, have invented certain new and useful Improvements in Sawing-Machines for Laths, Pickets, &c.; and I do hereby declare that the following is a full, clear, and exact description of the invention, that will enable others skilled in the art to which it appertains to make and use the same, reference being had to the accompanying drawings, forming a part of this specification, in which—

Figure 1 shows a side elevation of my invention; Fig. 2, a front view of rear set of rolls. Fig. 3 shows a section of a portion of the machine, showing one set of feed-gear, the frame being removed.

Same letters show like parts.

My invention relates to certain improvements in sawing-machines, particularly adapted to those machines used for sawing laths, pickets, and similar stuff.

It consists, first, in appliances whereby the upper and lower feed-rolls on each side of the saw are rendered readily adjustable to different widths (vertical) of lumber without changing the rolls or stopping the machine, and the rolls and shafts at the same time kept parallel with the shafts of the lower feed-rolls and in a horizontal position; second, to self-regulating devices, whereby the upper and lower rolls accommodate themselves to inequalities in the lumber sawed; third, to devices for preventing the lumber from "pinching" the saw or from "shimming;" fourth, to devices for adjusting the distance of the rolls and saw-table from the periphery of the saw.

Reference to the drawings will illustrate my invention.

At $a$ is shown the frame of the machine, supporting a bed, B, made in two parts, $b\ b'$, the saw C being journaled between them. Each part of this bed carries a pair of standards, $c\ c'$—one at each side—in which are journaled shafts $d\ d'$, having gears $e\ e'$ and pulleys $f\ f'$ thereon. These gears mesh into intermediate gears, $g\ g'$, which in turn engage gears $h\ h'$ upon shafts $i\ i'$, which shafts carry the upper feed-rolls, $j\ j'$. Returning to the gears $e\ e'$, they also engage with gears $k\ k'$ upon shafts $l\ l'$, upon the opposite end of which are the lower feed-rolls, $m\ m'$. The shafts $i\ i'\ l\ l'$, carrying the upper and lower feed-rolls, $j\ j'\ m\ m'$, are not journaled in the standards $c\ c'$, but upon arms $n\ n'\ o\ o'$, loosely moving upon the shafts $d\ d'$ and upon the shafts $p\ p'$, upon which latter are the intermediate gears before mentioned; and it will be observed that by this arrangement the upper rolls may be varied in distance from the lower rolls to accommodate different widths of lumber without cramping or otherwise interfering with the operation of the gears, and keeping the shafts always parallel and horizontal. This adjustment may be made, while the machine is in operation, by any well-known means acting simultaneously and equally on both front and rear rolls—such, for instance, as the sliding inclines $q\ q'$ shown in Fig. 1.

To enable the upper and lower rolls to accommodate themselves to slight inequalities in the lumber sawed, I attach chains or cords $r\ r'$ to the arms $o\ o'$ of the lower feed-rolls and pass them up over loose pulleys $s\ s'$ (see dotted lines) on the shafts of the upper feed-rolls and down under the frame of the machine, attaching to their lower ends weights $t\ t'$, sufficiently heavy to secure the requisite "bite" upon the lumber, but still allowing a variation in distance between the rolls. The downward movement of the lower feed-roll need not of course be much, if any, more than to bring its periphery flush with the surface of the table, while its upward motion may be of any desired extent and regulated by the character of the lumber to be sawed. In case of a projection on the under surface of the lumber the upper roll, being heavier, as shown, forces the lumber and lower roll down until the former is stopped by the surface of the saw-table, the weight, however, always keeping said lower roll in contact with the lumber. When a hollow is encountered the lower roll is raised by the action of the weight, so that it still acts effectively in feeding the stuff.

My device for preventing pinching of the saw or shimming is shown in Fig. 2, and consists in providing the second set of feed-rolls, $j'\ m'$, back of the saw with a rim, $w$, sharpened somewhat at its edge, surrounding the rolls on a line with the scarf cut by the saw, and adapted to enter said scarf after the lumber leaves the saw, retaining and guiding it in a straight line. As these rims enter the saw-scarf on both the upper and lower edges of the lumber, they also serve to keep it in an upright position and prevent turning or canting over.

I have stated that my bed B was made in two parts, b b', one carrying the front and the other the rear set of feed-rolls. To each of these parts is also secured one part, x x', of a saw-table. The parts b b' of the bed are adjustable lengthwise on the frame by means of bolts and nuts y entering slots z in said frame, (see dotted lines,) thus enabling the bed and all its attachments to be advanced or withdrawn to or from the saw, as desired, and to be kept close to its periphery as it wears away, securing better and more effective work from the machine.

I do not claim devices in which the upper feed-rolls and operating-gear are raised perpendicularly, as this disengages the gear upon the end of the feed-roll shaft from the corresponding gear through which it receives its motion. My feed-roll shaft and gear moves in the arc of a circle around the intermediate gear, so that it is always in connection with the actuating-gear of the machine, no matter what its relative position is in regard to the lower feed-roll or saw-table. Neither do I claim generally the use of weights to keep the upper feed-roll upon the stuff to be sawed. My weights are arranged in a peculiar way, the operation being to draw the upper and lower feed-rolls together and not merely to draw the upper one down, as usual. In my machine both rolls have an independent action approaching or withdrawing from each other, but always acted upon by the weight and pulley, as stated.

What I claim as my invention is—

1. In a sawing-machine, the upper and lower feed-rolls, $j\ j'\ m\ m'$, mounted upon arms $n\ n'\ o\ o'$, in combination with a cord or chain, $r\ r'$, secured to said arms $n'\ o'$, or to the shafts of the lower pulleys, passing up over loose pulleys $s\ s'$ upon the shafts of the upper feed-rolls, and connected at their lower ends with weights $t\ t'$, whereby said upper and lower feed-rolls are mutually acted upon by said weights drawing them toward each other and holding the lumber between them, substantially as described.

2. In combination with the rear set of feed-rolls of a sawing-machine, the guide-rims $w$, surrounding said rolls and adapted to enter the saw-scarf, as and for the purposes described.

3. In a sawing-machine provided with front and rear feed-rolls, $j\ j'\ m\ m'$, the two-part bed $b\ b'$, carrying said rolls, as shown, and having the two-part saw-table $x\ x'$, secured thereto, said bed and attachments being adjustable toward or from the saw C, substantially as and for the purposes herein set forth.

In testimony that I claim the foregoing I have hereunto set my hand this 12th day of June, 1882.

THOMAS M. CHAPMAN.

Witnesses:
 JOHN A. BARRY,
 WM. FRANKLIN SEAVEY.